US011199803B2

(12) United States Patent
Kai et al.

(10) Patent No.: US 11,199,803 B2
(45) Date of Patent: Dec. 14, 2021

(54) DRIVING DEVICE, IMAGE FORMING DEVICE, AND METHOD OF MANUFACTURING DRIVING DEVICE

(71) Applicant: CANON KABUSHIKI KAISHA, Tokyo (JP)

(72) Inventors: Yusuke Kai, Kawasaki (JP); Yusuke Niikawa, Kawasaki (JP); Shoji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/991,923

(22) Filed: Aug. 12, 2020

(65) Prior Publication Data

US 2021/0055682 A1   Feb. 25, 2021

(30) Foreign Application Priority Data

Aug. 20, 2019   (JP) .............................. JP2019-150749

(51) Int. Cl.
*G03G 15/00* (2006.01)
*F16D 3/04* (2006.01)
*F16H 55/17* (2006.01)
*F16H 1/20* (2006.01)

(52) U.S. Cl.
CPC ............. *G03G 15/757* (2013.01); *F16D 3/04* (2013.01); *F16H 55/17* (2013.01); *F16H 1/20* (2013.01)

(58) Field of Classification Search
CPC ............................... F16D 3/04; G03G 15/757; G03G 2221/1657; F16H 1/08; F16H 1/20; F16H 2055/065; F16H 55/17
See application file for complete search history.

(56) References Cited

U.S. PATENT DOCUMENTS

| 9,341,996 | B1* | 5/2016 | Buchanan | G03G 15/2017 |
| 2011/0017003 | A1* | 1/2011 | Taniguchi | G03G 15/757 74/412 R |
| 2015/0212456 | A1* | 7/2015 | Imaizumi | G03G 15/1615 74/665 G |
| 2017/0293248 | A1* | 10/2017 | Yoshida | F16D 3/04 |
| 2018/0180106 | A1* | 6/2018 | Hara | F16D 11/04 |

(Continued)

FOREIGN PATENT DOCUMENTS

JP   2013-155779 A   8/2013

*Primary Examiner* — Francis C Gray
(74) *Attorney, Agent, or Firm* — Canon U.S.A., Inc., IP Division

(57) ABSTRACT

A driving device includes a motor including a rotating shaft, a drive transmission member attached to the rotating shaft and including a contact portion, and a drive output member including a contacted portion with which the contact portion comes into contact, and configured to be rotated around the rotating shaft when the rotating shaft of the motor is driven and the drive transmission member is rotated together with the rotation shaft in a first direction. The drive transmission member further includes an engaging portion. The drive output member includes an engaged portion with which the engaging portion is to be engaged when the drive output member is rotated relative to the drive transmission member in a second direction opposite to the first direction. A driving force is transmittable to the drive output member whether the drive transmission member is rotated in the first direction or the second direction.

20 Claims, 16 Drawing Sheets

(56) References Cited

U.S. PATENT DOCUMENTS

2018/0188682 A1* 7/2018 Kim .................. G03G 21/1864
2018/0264857 A1* 9/2018 Yamaguchi .......... B65H 3/0669
2019/0094796 A1* 3/2019 Kawamura .......... G03G 15/757

* cited by examiner

DRIVING DEVICE, IMAGE FORMING DEVICE, AND METHOD OF MANUFACTURING DRIVING DEVICE

BACKGROUND

Field

The present disclosure relates to a driving device that includes a motor that is a drive source used in, for example, an electrophotographic image forming device.

Description of the Related Art

An image forming device, such as a copier or a printer, includes a motor that rotationally drives, for example, a photoconductive drum, a fixing roller, and a feed roller. A driving device is used, in which a pinion gear that is a drive output member is attached to a rotating shaft of the motor and the pinion gear is rotated to drive a gear that is a driven member and meshes with the pinion gear. The driving device needs to rotate an image forming unit, such as a photoconductive drum, with accuracy to enhance image quality of printed images. For this reason, accuracy of gears, such as the pinion gear that is a drive output member, needs to be maintained.

Under such circumstances, a helical gear may be used as the pinion gear that is a drive output member of the driving device. In this case, the pinion gear receives a force in a thrust direction of the rotating shaft as a reaction force to driving when the pinion gear meshes with a driven gear that is a driven member. A direction of a thrust force that acts on the pinion gear may be a direction in which the pinion gear is removed from the rotating shaft of the motor. In this case, the pinion gear needs to be fixed to the rotating shaft so that the pinion gear is not removed from the rotating shaft.

Japanese Patent Application Laid-Open No. 2013-155779 discusses a method of fixing a pinion gear that is a drive output member to a rotating shaft while securing gear accuracy of the pinion gear. The pinion gear has a gear-uncut area where teeth are not cut and a gear-cut area where teeth are cut. As the method of fixing the pinion gear to the rotating shaft, the rotating shaft is pressed into the gear-uncut area and the rotating shaft is not pressed into the gear-cut area in a thrust direction of the pinion gear.

However, with this configuration, to surely fix the pinion gear to the rotating shaft, rotating shaft is pressed into the pinion gear that is a drive output member. To surely fix the pinion gear to the rotating shaft, a large force is needed to press the pinion gear onto the rotating shaft. Consequently, the pinion gear may be deformed when the rotating shaft is pressed into the pinion gear. Accuracy of a position where the pinion gear is attached may thus deteriorate. Consequently, the pinion gear may become eccentric relative to the rotational center of the rotating shaft of the motor, accuracy of rotation of rotated member is decreased, and image quality of an image forming device that includes the driving device may be decreased.

SUMMARY

According to an aspect of the present disclosure, a driving device includes a motor including a rotating shaft, a drive transmission member attached to the rotating shaft and including a contact portion, and a drive output member including a contacted portion with which the contact portion comes into contact and configured to be rotated around the rotating shaft when the rotating shaft of the motor is driven and the drive transmission member is rotated together with the rotating shaft in a first direction. The drive transmission member further includes an engaging portion. The drive output member includes an engaged portion configured to engage with the engaging portion when the drive output member is rotated relative to the drive transmission member in a second direction that is opposite to the first direction. A driving force is transmittable to the drive output member whether the drive transmission member is rotated in the first direction or the second direction.

According to another aspect of the present disclosure, a method of manufacturing a driving device relates to a method of manufacturing a driving device including a motor including a rotating shaft, a drive transmission member attached to the rotating shaft and including a contact portion, and a drive output member including a contacted portion with which the contact portion comes into contact and configured to be rotated around the rotating shaft when the rotating shaft of the motor is driven and the drive transmission member is rotated together with the rotating shaft in a first direction. The method of manufacturing a driving device includes a first step of attaching the drive transmission member to the drive output member while an engaging portion of the drive transmission member is engaged with an engaged portion of the drive output member and the contact portion is in contact with the contacted portion, and a second step of attaching the drive transmission member to the rotating shaft after the first step.

Further features of the present disclosure will become apparent from the following description of exemplary embodiments with reference to the attached drawings.

DESCRIPTION OF THE EMBODIMENTS

To describe exemplary embodiments of the present disclosure in detail, exemplary embodiments are exemplified with reference to the drawings. However, sizes, materials, shapes, relative arrangements of components described in the exemplary embodiments should be appropriately modified based on a configuration of a device to which the exemplary embodiments are applied, and various conditions. It is not intended that a scope of the present disclosure is limited to the exemplary embodiments described below.

To outline a driving device according to a present exemplary embodiment, an image forming device, particularly an electrophotographic laser printer, will be exemplified.
(Image Forming Device)

Figure 1:
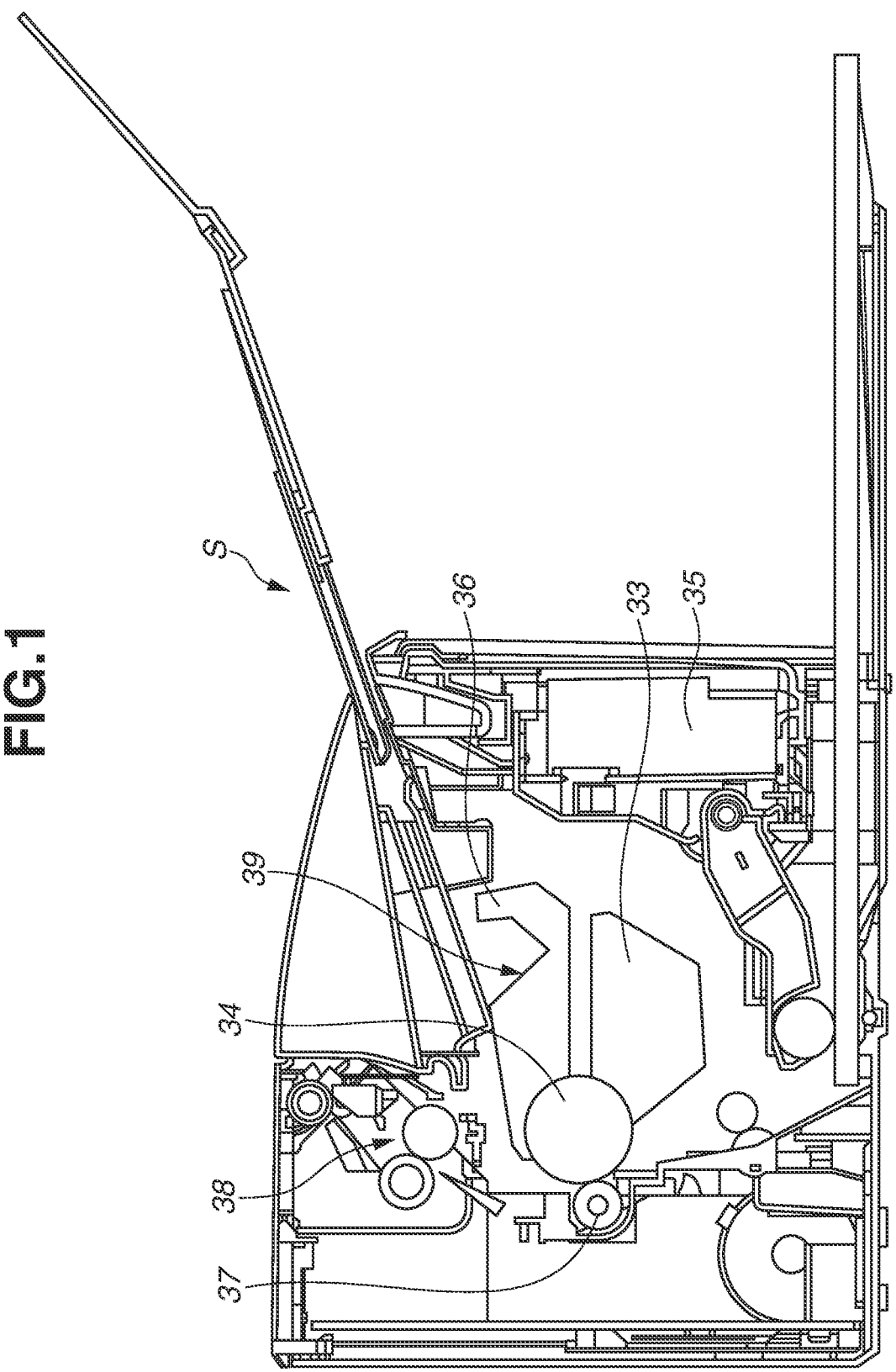
FIG. 1 is a schematic view of an image forming device according to a first exemplary embodiment.

Before the driving device is described, the laser printer will be described with reference to FIG. 1. FIG. 1 is a cross-sectional view that illustrates a whole configuration of an image forming device S that is the laser printer.

An image forming process in an image forming unit that uses electrophotography is performed, for example, as follows: First, a surface of a photoconductive drum 34 is uniformly charged with a predetermined polarity by a charging unit. Then, based on image data of an image that will be formed on a recording medium, an exposing unit 35, such as a laser, forms a latent image on the photoconductive drum 34.

A development unit 33 attaches toner to the latent image formed on the photoconductive drum 34. The latent image is developed and visualized as a toner image. In this state, the photoconductive drum 34 bears the toner image.

The toner image formed on the photoconductive drum 34 is conveyed to a transfer nip formed by a transfer roller 37 and the photoconductive drum 34. On the other hand, a recording medium stored in the image forming device S is conveyed to the transfer nip. At the transfer nip, the toner image on the photoconductive drum 34 is transferred to the recording medium by application of high voltage that has a polarity opposite to a polarity with which the toner is normally charged.

Finally, the recording medium to which the toner image has been transferred is conveyed to a fixing unit 38. The recording medium is heated and pressed, and thus the toner image is fixed to the recording medium. In the above-described process, the image is formed on the recording medium.

The image forming unit is a unit that forms an image on a recording medium. The image forming unit includes at least the photoconductive drum 34, the charging unit, the development unit 33, and a transfer unit.

After a toner image is transferred, a small amount of toner that has an opposite polarity and the like stick to the photoconductive drum 34. For this reason, after the photoconductive drum 34 passes the transfer nip, a cleaning unit 39 or the like removes the objects that stick to a surface of the photoconductive drum 34. Then the photoconductive drum 34 waits for next image forming.

The image forming device S according to the present exemplary embodiment includes a process cartridge. The process cartridge includes the photoconductive drum 34, the charging unit, the development unit 33, and the cleaning unit 39 that have been described above, and a handle 36 being integrated with each other. The process cartridge is removably installed in a main body of the image forming device S. The main body of the image forming device S includes a housing of the image forming device S. An integrated cartridge is not limited to the above-described process cartridge. For example, there are a drum cartridge, a development cartridge, and a toner cartridge. The drum cartridge includes a drum that is a photoconductive drum, and a cleaning unit being integrated with each other. The development cartridge includes a development unit, such as a development roller, and a developer storage portion being integrated with each other. The toner cartridge includes a developer storage portion to be singly detachable to the toner cartridge.
(Driving device)

Figure 2:
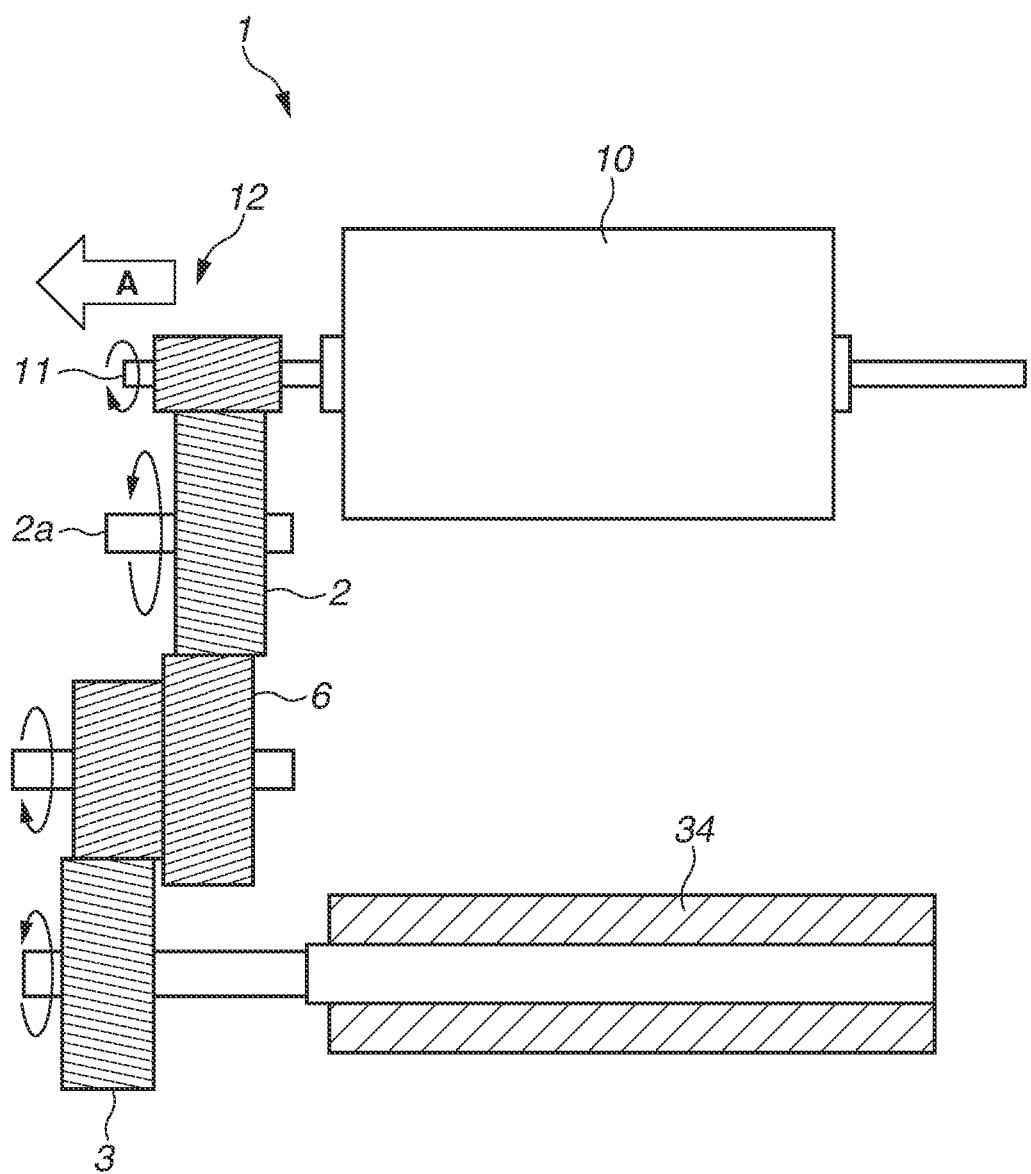
FIG. 2 is a schematic view of a driving device according to the first exemplary embodiment.

FIG. 2 is a schematic view of the driving device according to a first exemplary embodiment.

A driving device 1 includes a motor 10 and a pinion gear 12 that is a drive output member and is attached to a rotating shaft 11 of the motor 10. The pinion gear 12 that is a drive output member drives a driven gear 2 that is a driven member. FIG. 2 illustrates an example in which a gear train of a drive output gear 3 is driven. The pinion gear 12 that is a drive output member is attached to the rotating shaft 11 of the motor 10. The driven gear 2 that is a driven member meshes with the pinion gear 12 that is a drive output member. Rotation of the rotating shaft 11 of the motor 10 is transmitted to the driven gear 2 via the pinion gear 12. The driven gear 2 that is a driven member is rotatably attached to a rotating shaft 2a. The drive output gear 3 that drives the process cartridge meshes with the driven gear 2 through a reduction gear 6. The drive output gear 3 is integrally attached to the photoconductive drum 34 that is attached to the process cartridge to be driven. That is to say, the drive output gear 3 is fixed to a shaft of the photoconductive drum 34.

When the motor 10 is driven, the rotating shaft 11 of the motor 10 and the pinion gear 12 are rotated. A rotary force (torque) of the rotating shaft 11 and the pinion gear 12 is transmitted to the photoconductive drum 34 via the driven gear 2, the reduction gear 6, and the drive output gear 3, and the photoconductive drum 34 is thus rotated.

In the present exemplary embodiment, the pinion gear 12 that is a drive output member, and the driven gear 2 that is a driven member are helical gears. A larger gear of the reduction gear 6 that meshes with the driven gear 2 is also a helical gear. A drive reaction force is applied to the pinion gear 12 in a thrust (shaft line) direction of the rotating shaft 11 when the pinion gear 12 meshes with the driven gear 2, because the pinion gear 12 is twisted. The pinion gear 12 is rotated in a direction illustrated in FIG. 2. A direction A in FIG. 2 is a direction in which the pinion gear 12 is removed from the rotating shaft 11. The pinion gear 12 that is a drive output member is twisted in the leftward direction. The pinion gear 12 is rotated clockwise when the motor 10 is viewed from the pinion gear 12 (FIG. 2).

A configuration of the driving device 1 will be described with reference to FIGS. 3, 4, 5A, and 5B.

Figure 3:
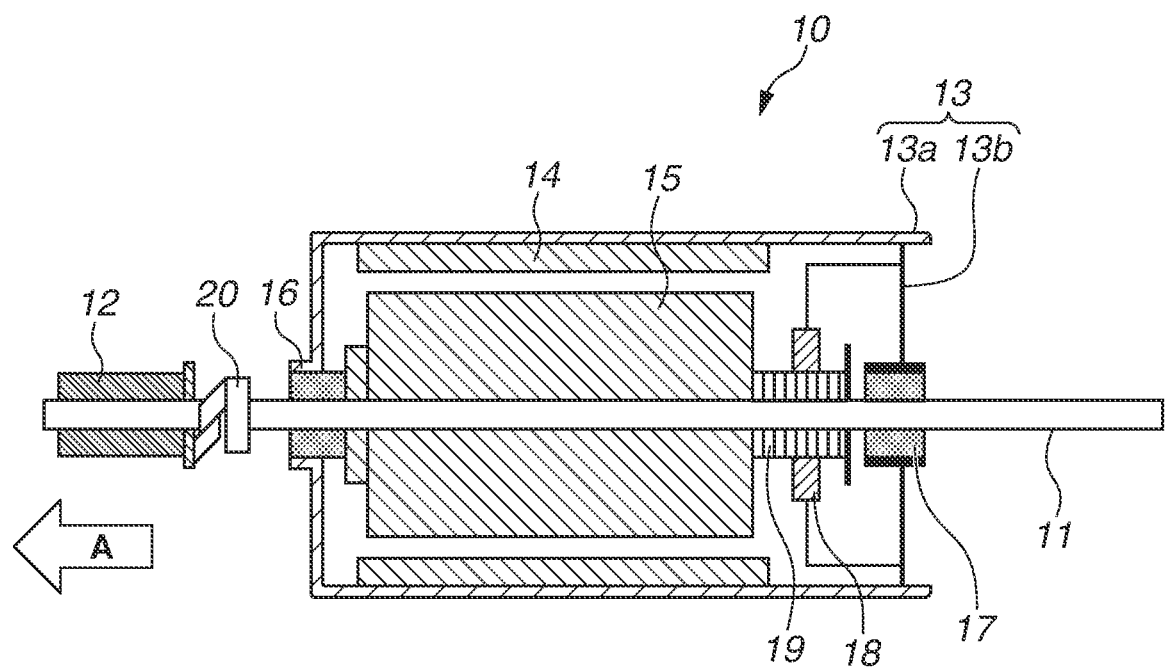
FIG. 3 is a cross-sectional view of a motor according to the first exemplary embodiment.
Figure 4:
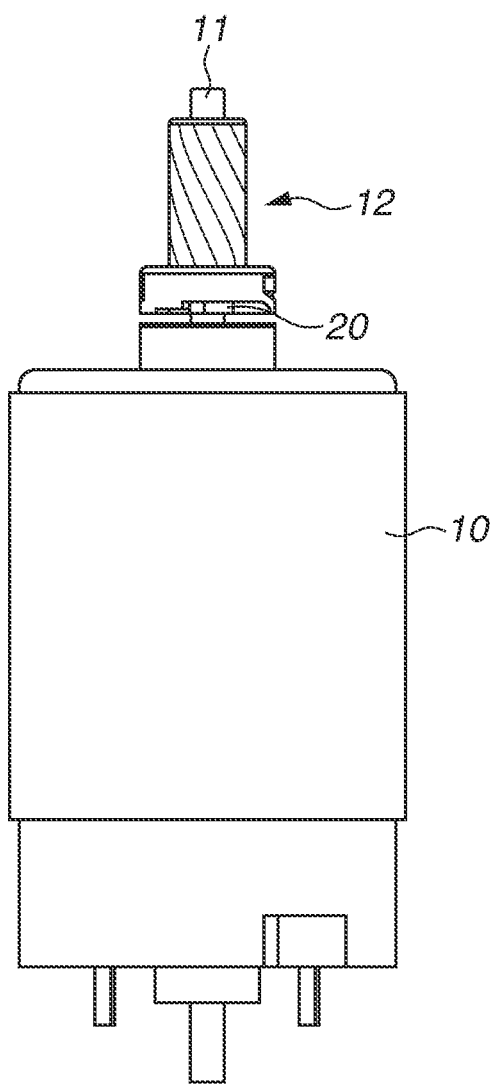
FIG. 4 is a schematic view of a pinion gear of the driving device and components around the pinion gear according to the first exemplary embodiment.
Figure 5A:
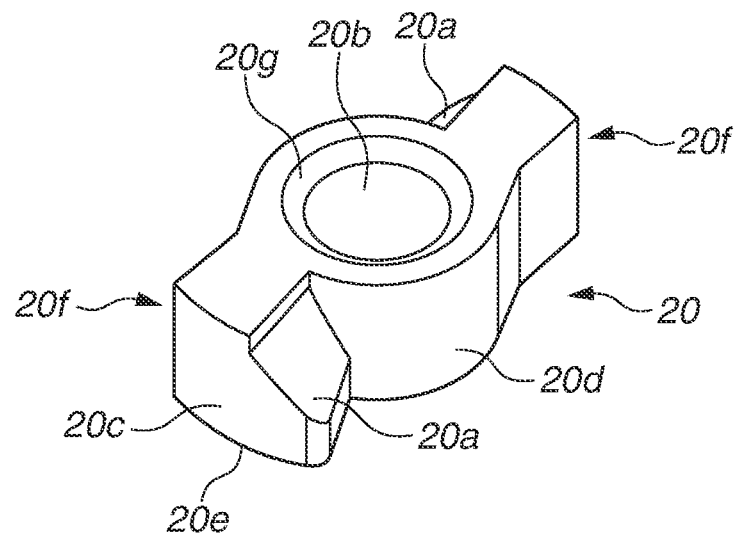
FIG. 5A is a schematic view of a drive transmission member according to the first exemplary embodiment.
Figure 5B:
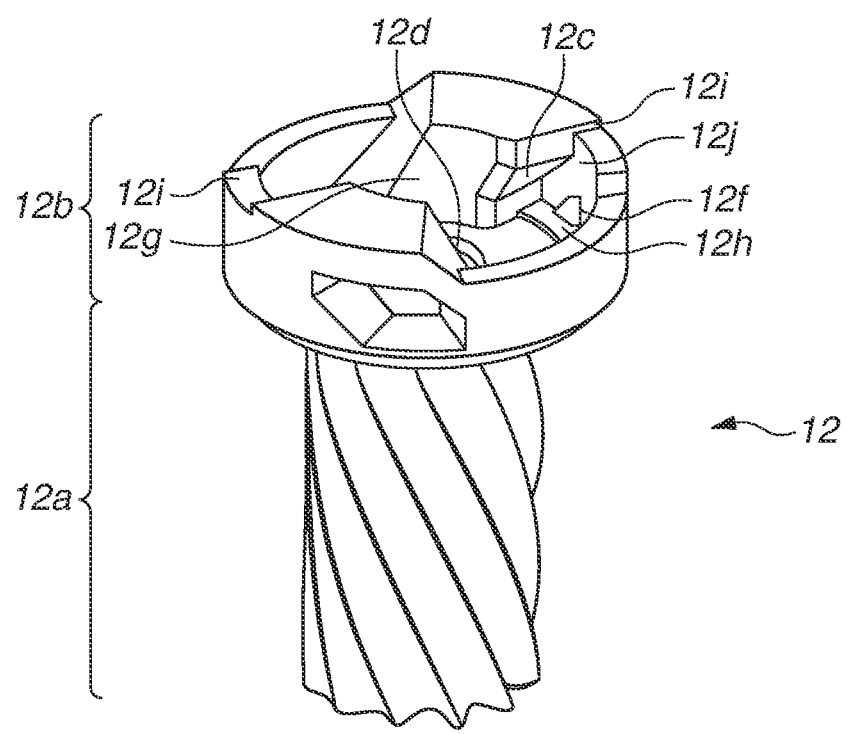
FIG. 5B is a schematic view of the pinion gear according to the first exemplary embodiment.

FIG. 3 is a cross-sectional view of the motor 10 according to the first exemplary embodiment. FIG. 4 is a schematic view of the pinion gear 12 of the driving device 1 and components around the pinion gear 12 according to the first exemplary embodiment. FIGS. 5A and 5B are perspective views of components of the driving device 1 according to the first exemplary embodiment.

(Configuration of Motor)

As illustrated in FIG. 3, the motor 10 is a direct current (DC) brush motor that includes a case 13, a magnet 14, a rotor 15, the rotating shaft 11, a first bearing 16, a second bearing 17, and a brush 18. An outer diameter of the rotating shaft 11 depends on a size of the DC brush motor. An outer diameter of a rotating shaft of a DC brush motor used for an image forming device is often approximately 3 mm.

The case 13 is a hollow cylindrical case formed of a metal material in such a way that the case 13 covers an outer periphery of the motor 10. The case 13 includes a main body (stator) 13a of the case 13 and a lid (bracket) 13b. The magnet 14 is a permanent magnet attached to an inner peripheral surface of the main body 13a of the case 13. The rotor 15 includes an iron core, a winding, and a commutator 19. The rotating shaft 11 outputs a driving force of the motor. The rotor 15 is attached to the rotating shaft 11. The rotor 15 and the rotating shaft 11 are rotated together.

The first bearing 16 is attached to the main body 13a of the case 13. The first bearing 16 rotatably supports a side of the rotating shaft 11 that includes the pinion gear 12. The second bearing 17 is attached to the lid 13b. The second bearing 17 rotatably supports the rotating shaft 11 on an opposite side of the first bearing 16 with the rotor 15 being disposed between the first bearing 16 and the second bearing 17. The first bearing 16 and the second bearing 17 are both sintered bearings, and are impregnated with lubricating oil. The brush 18 is attached to the lid 13b, and is in contact with the commutator 19 to supply electrical energy to the rotor 15. The rotor 15 is disposed between the first bearing 16 and the second bearing 17 with a gap therebetween in the thrust direction.

If the commutator 19 comes into contact with the second bearing 17 when the motor 10 is driven, oil with which the second bearing 17 is impregnated bleeds and enters the commutator 19. At this time, the brush 18 and the commutator 19 may malfunction. As one countermeasure against the issue, the pinion gear 12 and the rotating shaft 11 receive a force in a thrust direction A when the motor 10 is driven. Consequently, the rotor 15 is in contact with the first bearing 16, and a gap is made between the commutator 19 and the second bearing 17, as illustrated in FIG. 3. Consequently, oil does not enter the commutator 19, and thus, the brush 18 and the commutator 19 do not malfunction.

(Configuration of Pinion Gear and Drive Transmission Member)

A configuration of the pinion gear 12 that is a drive output member, and a drive transmission member 20 will be described.

As illustrated in FIG. 4, the drive transmission member 20 is attached to the rotating shaft 11 of the motor 10. The drive transmission member 20 is arranged between the case 13 and the pinion gear 12. That is to say, the case 13, the drive transmission member 20, and the pinion gear 12 are arranged in that order, from an upstream side to a downstream side in a direction in which the pinion gear 12 that is a drive output member is removed from the rotating shaft 11. The drive transmission member 20 plays a role of transmitting rotation of the rotating shaft 11 of the motor 10 to the pinion gear 12 that is a drive output member. As illustrated in FIG. 5A, the drive transmission member 20 has contact surfaces (contact portions) 20a, a hole 20b, outer-periphery portions (engaging surfaces) 20c, fitting portions 20d, a pushing surface 20e, and a guiding surface 20g. To transmit drive to the pinion gear 12, the two contact surfaces 20a are arranged at substantially regular intervals in a circumferential direction of a circle the center of which is the hole 20b. The hole 20b is a through-hole in which the rotating shaft 11 of the motor 10 is fitted. The fitting portions 20d surround the hole 20b. The two outer-periphery portions 20c regulate movement of the drive transmission member 20 relative to the pinion gear 12. The pushing surface 20e pushes the pinion gear 12 in the thrust direction.

As illustrated in FIG. 5B, the pinion gear 12 has a hole 12d in which the rotating shaft 11 is fitted, a gear portion 12a that has a gear, and a drive transmission portion 12b. The drive transmission portion 12b has contacted surfaces (contacted portions) 12c, press-in ribs (engaged portions) 12f, a pushed surface 12h, and fitting portions 12g. The contacted surfaces 12c engage with the contact surfaces 20a of the drive transmission member 20. The two press-in ribs 12f are symmetric with respect to the rotating shaft. The press-in ribs 12f regulate movement of the drive transmission member 20. The pushed surface 12h is a portion pushed (touched) in the thrust direction by the pushing surface 20e of the drive transmission member 20. The fitting portions 12g surround the fitting portions 20d.

The drive transmission member 20 is a metallic component. The drive transmission member 20 is formed by, for example, sintering iron, or cutting brass. On the other hand, the pinion gear 12 is a molded-resin article. The pinion gear 12 is formed of molded polyacetal (POM) that is generally used for gears. If the drive transmission portion 12b of the pinion gear 12 is formed by molding resin, the contacted surfaces 12c are undercut in the vertical direction in FIG. 5B in which a cavity block and a core block are removed. When recesses 12f that have the contacted surfaces 12c are formed, rotation plugs are used to undercut the contacted surfaces 12c. Alternatively, slide plugs may be used, in which case the slide plugs are slid to form the contacted surfaces 12c.

An inner diameter of the hole 20b of the drive transmission member 20 is smaller than a diameter of the rotating shaft 11 of the motor 10. Therefore, the rotating shaft 11 of the motor 10 is pressed into the drive transmission member 20. Consequently, friction prevents the drive transmission member 20 from slipping on the rotating shaft 11. A rotary force transmitted from the rotating shaft 11 is surely transmitted to the pinion gear 12.

As described above, the rotation of the rotating shaft 11 is transmitted to the pinion gear 12 via the drive transmission member 20. Therefore, it is not necessary to press the rotating shaft 11 into the pinion gear 12. That is to say, the rotation does not need to be directly transmitted to the pinion gear 12 from the rotating shaft 11 of the motor 10. Therefore, materials used for the pinion gear 12 are not restricted due to a press-in strength and the like, and various materials are used for the pinion gear 12. Accordingly, resin materials can be used. However, if POM that is generally used for gears is used as a material for the pinion gear 12, an error in meshing transmission from the pinion gear 12 to the driven gear 2 can be reduced more than in meshing transmission from a pinion gear 12 that includes metal to the driven gear 2. Further, drive noise can be reduced. Therefore, in the present exemplary embodiment, the pinion gear 12 that includes POM is used.

In the present exemplary embodiment, however, an inner diameter of the hole 12d of the pinion gear 12 is equal to or slightly smaller than an outer diameter of the rotating shaft 11. That is to say, a force by which the rotating shaft 11 is inserted or pressed into the pinion gear 12 is smaller than a force by which the rotating shaft 11 is pressed into the drive transmission member 20. This is because a difference between the inner diameter of the hole 12d and the outer diameter of the rotating shaft 11 is favorably as small as possible to prevent deformation of the pinion gear 12 and the rotating shaft 11, and to secure accuracy of a position where the pinion gear 12 is attached to the rotating shaft 11. Backlash with the rotating shaft 11 inserted in the hole 12d is to be eliminated so that the accuracy of a position where the pinion gear 12 is attached does not deteriorate when the rotating shaft 11 is pressed into the pinion gear 12. More specifically, the pinion gear 12 does not become eccentric relative to the rotational center of the rotating shaft 11 when the rotating shaft 11 is pressed into the pinion gear 12.

The rotating shaft 11 may be pressed into the pinion gear 12 so that a driving force is transmitted not through the drive transmission member 20. In this case, to prevent the pinion gear 12 from rotating around the rotating shaft 11, a difference in the diameters needs to be secured. Accordingly, the rotating shaft 11 is pressed into the pinion gear 12 with a larger force, and the pinion gear 12 may be deformed, and may become eccentric relative to the rotational center of the rotating shaft 11.

In the present exemplary embodiment, the drive transmission member 20 is used. The drive transmission member 20 plays a role of receiving a driving force from the rotating shaft 11. The drive transmission member 20 surely receives the driving force from the rotating shaft 11. Therefore, accuracy of a position where the pinion gear 12 is attached can be enhanced.

Figure 6:
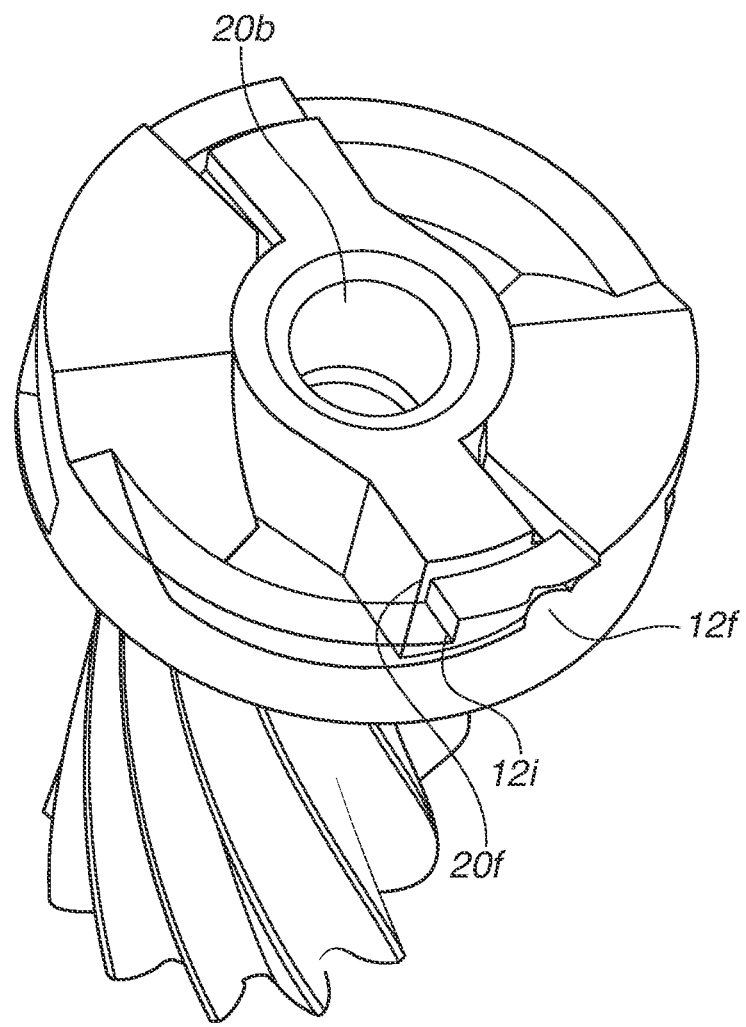
FIG. 6 is a schematic view of the pinion gear and the drive transmission member attached to each other according to the first exemplary.

As illustrated in FIG. 6, the pinion gear 12 and the drive transmission member 20 according to the present exemplary embodiment are configured to be held together. A portion of the drive transmission member 20 enters between the contacted surfaces 12c and the pushed surface 12h of the pinion gear 12. The portion of the drive transmission member 20 extends in the axial direction and has a wedge-shaped cross section. The contacted surfaces 12c and the pushed surface 12h of the pinion gear 12 are opposite each other. More specifically, the contact surfaces 20a and the contacted surfaces 12c are parallel to each other when the contact surfaces 20a and the contacted surfaces 12c come into contact to be engaged with each other while the pushing surface 20e and the pushed surface 12h are in contact with each other. As described above, inclination angles of the engaging surfaces are equal to each other so that a contact area is increased and an amount of deformation of the engaging surfaces is decreased.

As described above, the pinion gear 12 according to the present exemplary embodiment is a helical gear. A direction of twist of the helical gear (pinion gear 12) and a direction of inclination of the contact surfaces 20a of the drive transmission member 20 each extend from one end to the other end of the rotating shaft 11 while going farther away from the rotating shaft 11 toward one side relative to the rotating shaft 11. In the present exemplary embodiment, a direction of inclination of the contacted surfaces 12c of the pinion gear 12 and the contact surfaces 20a of the drive transmission member 20 is set to be the same as a direction of twist of the pinion gear 12. Consequently, if an inclination angle of the contact surfaces 20a and the contacted surfaces 12c causes a thrust force due to the engaging surfaces to be larger than a thrust force due to a twist angle of the pinion gear 12 that is a helical gear, the pinion gear 12 is not removed from the rotating shaft 11 and is held on the rotating shaft 11. For example, when a twist angle of the pinion gear 12 is 20°, an inclination angle of the contact surfaces 20a and the contacted surfaces 12c may be 45°.

As described above, in the present exemplary embodiment, the inclination angle of the contact surfaces 20a is equal to the inclination angle of the contacted surfaces 12c. However, the inclination angle of the contact surfaces 20a may be different from the inclination angle of the contacted surfaces 12c as long as the inclination angle of the contact surfaces 20a and the inclination angle of the contacted surfaces 12c causes the thrust force due to the engaging surfaces to be larger than the thrust force due to the twist angle of the pinion gear 12. Since the thrust force due to the engaging surfaces depends on the inclination angle of the contacted surfaces 12c, the contact surfaces 20a that have any inclination angle can function.

Further, in the present exemplary embodiment, the contact surfaces 20a and the contacted surfaces 12c can continue to be in contact and engaged with each other while the pushing surface 20e and the pushed surface 12h are in contact with each other. More specifically, the pinion gear 12 has the two fitting portions 12g and the two press-in ribs 12f. Positions of the two fitting portions 12g are symmetric with respect to the rotating shaft. Positions of the two press-in ribs 12f are symmetric with respect to the rotating shaft. Meanwhile, the drive transmission member 20 has the two fitting portions 20d and the two outer-periphery portions 20c (engaging surfaces). Positions of the two fitting portions 20d are symmetric with respect to the rotating shaft. Positions of the two outer-periphery portions 20c (engaging surfaces) are symmetric with respect to the rotating shaft. In the present exemplary embodiment, the two outer-periphery portions 20c of the drive transmission member 20 are held between the press-in ribs (engaged portions) 12f of the pinion gear 12. The press-in ribs (engaged portions) 12f include two protrusions. As described above, the contact surfaces 20a and the contacted surfaces 12c can continue to be in contact with each other while the pushing surface 20e and the pushed surface 12h are in contact with each other. That is to say, when the drive transmission member 20 and the rotating shaft 11 are rotated one way (in a first direction), the contact surfaces 20a come into contact with the contacted surfaces 12c of the pinion gear 12. When the drive transmission member 20 and the rotating shaft 11 are rotated the other way (in a second direction), the outer-periphery portions 20c gets engaged with the press-in ribs 12f. As described above, the drive transmission member 20 transmits a driving force to the pinion gear 12 whether the drive transmission member 20 is rotated one way or the other.

(Operation of Driving Device)

Operation of the pinion gear 12 and other components around the pinion gear 12 during operation of the driving device 1 will be described.

As described above, the rotating shaft 11 of the motor 10 is pressed into the drive transmission member 20 with sufficient strength. For this reason, the pinion gear 12 is detachable from the rotating shaft 11 although the pinion gear 12 is attached to the rotating shaft 11 in such a manner that no fitting gap is left. The contact surfaces 20a of the drive transmission member 20 come into contact to be engaged with the contacted surfaces 12c of the pinion gear 12 in a rotational direction. Consequently, the drive transmission member 20 transmits a rotary force (torque) to the pinion gear 12. The drive transmission member 20 is rotated by rotation of the rotating shaft 11 of the motor 10. The drive transmission member 20 gets engaged with the pinion gear 12 that is a drive output member. In this way, the pinion gear 12 is driven. On the other hand, the pushing surface 20e of the drive transmission member 20 pushes the pushed surface 12h of the pinion gear 12 in the thrust direction.

Accordingly, rotation of the rotating shaft 11 of the motor 10 is transmitted to the drive transmission member 20 in which the rotating shaft 11 is pressed with sufficient strength. That is to say, the drive transmission member 20 is driven by rotation of the rotating shaft 11 of the motor 10. As a result, the pinion gear 12 that is a drive output member is driven through contact points between the contact surfaces 20a of the drive transmission member 20 and the contacted surfaces 12c of the pinion gear 12 that is a drive output member.

The drive transmission member 20 has the contact surfaces 20a that are inclined. The pinion gear 12 has the contacted surfaces 12c that are inclined. Consequently, the drive transmission member 20 functions to prevent the pinion gear 12 from being removed although the drive transmission member 20 is disposed near a root of the pinion gear 12 in the rotational-axis direction. A position of the pinion gear 12 relative to the drive transmission member 20 in the thrust direction is determined by the pushing surface 20e and the pushed surface 12h coming into contact with each other and the contact surfaces 20a and the contacted surfaces 12c coming into contact with each other. For this reason, no gap is generated in the thrust direction between the pinion gear 12 and the drive transmission member 20. Accordingly, since the pinion gear 12 is not moved in the thrust direction when torque varies during the drive, displacement of the object to be driven (photoconductive drum 34) in a rotational direction can be prevented.

In the present exemplary embodiment, the drive transmission member 20 has the contact surfaces 20a that are inclined, and the pinion gear 12 has the contacted surfaces 12c that are inclined. However, one of the drive transmission member 20 and the pinion gear 12 may have engaging surfaces that are inclined, and the other one of the drive transmission member 20 and the pinion gear 12 may have engaging surfaces that have a cylindrical shape, such as a parallel pin. Even in this case, similar effects can be obtained. The shape is not limited to the cylindrical shape.

Even if the drive transmission member 20 has only one contact surface 20a, and the pinion gear 12 has only one contacted surface 12c, the contact surface 20a and the contacted surface 12c function. The drive transmission member 20 may have two contact surfaces 20a, and the pinion gear 12 may have two contacted surfaces 12c, as in the present exemplary embodiment. Further, the drive transmission member 20 may have three or more contact surfaces 20a arranged in the circumferential direction, and the pinion gear 12 may have three or more contacted surfaces 12c arranged in the circumferential direction. As the plurality of engaging surfaces is provided, the drive transmission member 20 more smoothly transmits torque to the pinion gear 12, and the pinion gear 12 is more smoothly driven. Since load applied to each of the engaging surfaces is dispersed, heights of the contact surfaces 20a and the contacted surfaces 12c in the thrust direction can be reduced. As a result, sizes of the pinion gear 12 and the drive transmission member 20 become small in the thrust direction.

(Method of Manufacturing Driving Device)

Figure 7A:
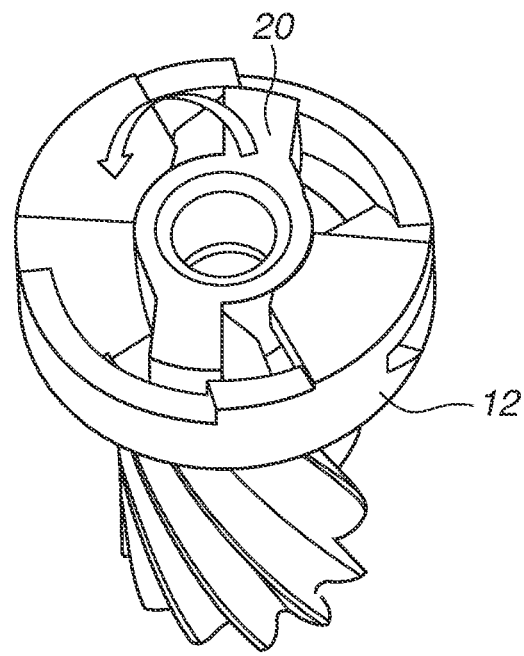
FIGS. 7A and 7B are schematic views of the drive transmission member attached to the pinion gear according to the first exemplary embodiment.

A method of manufacturing the driving device 1 will be described. In the present exemplary embodiment, the method of manufacturing the driving device 1 includes attaching the drive transmission member 20 to the pinion gear 12 before the drive transmission member 20 and the pinion gear 12 are attached to the rotating shaft 11 of the motor 10. A step of attaching the drive transmission member 20 to the pinion gear 12 will be described with reference to FIGS. 7A and 7B.

Figure 7B:
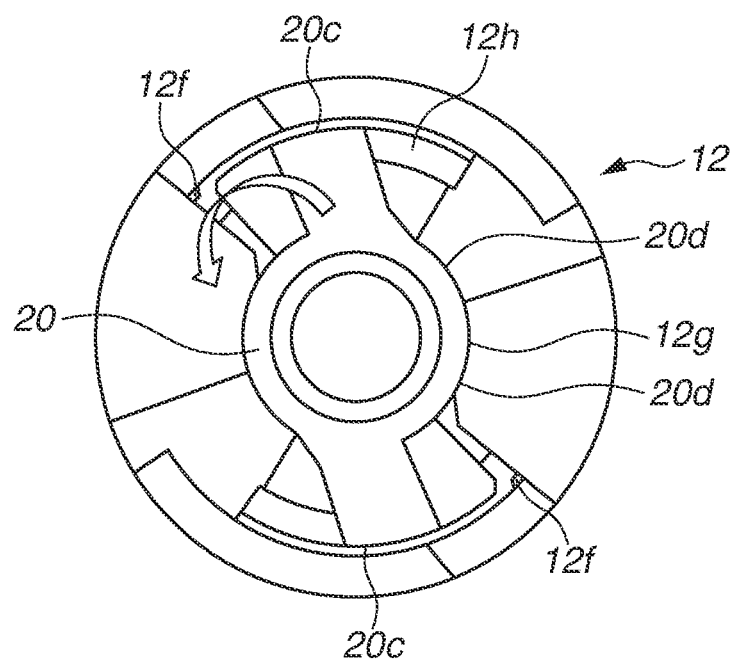

The pushing surface 20e of the drive transmission member 20 is pushed against the pushed surface 12h of the pinion gear 12. At this time, as illustrated in FIG. 7B, the press-in ribs 12f are at phases where the press-in ribs 12f are not in contact with the outer-periphery portions 20c of the drive transmission member 20. Therefore, the pushed surface 12h can be pushed against the pushing surface 20e. The pinion gear 12 is attached to the drive transmission member 20 by rotation of the drive transmission member 20 relative to the pinion gear 12.

An interval between the two press-in ribs 12f of the pinion gear 12 is smaller than an outer diameter between the outer-periphery portions 20c of the drive transmission member 20 (a distance between the two outer-periphery portions 20c). When the pinion gear 12 is attached to the drive transmission member 20, the drive transmission member 20 is pressed into the pinion gear 12, and is held in the pinion gear 12. In this way, the drive transmission member 20 is fixed to and held by the pinion gear 12 before the drive transmission member 20 and the pinion gear 12 are attached to the motor 10.

A difference between the outer diameter between the outer-periphery portions 20c of the drive transmission member 20 and the interval between the two press-in ribs 12f is preferably as small as possible. Further, a width of the press-in ribs 12f in the rotational direction is preferably as small as possible. After the rotating shaft 11 is pressed into the pinion gear 12 to which the drive transmission member 20 is attached, the rotating shaft 11 is pressed into the hole 12d of the pinion gear 12 and the hole 20b of the drive transmission member 20. The pinion gear 12 and the drive transmission member 20 are positioned in place. For this reason, it is preferable that a positional relation between the pinion gear 12 and the rotating shaft 11, and a positional relation between the pinion gear 12 and the drive transmission member 20 can be maintained by squashing and deforming the press-in ribs 12f.

It is preferably that the press-in ribs 12f are arranged at phases where the press-in ribs 12f do not come into contact with the outer-periphery portions 20c when the pushing surface 20e of the drive transmission member 20 is pushed against the pushed surface 12h of the pinion gear 12. This is because, when the pushing surface 20e of the drive transmission member 20 is pushed against the pushed surface 12h of the pinion gear 12, generation of an external force during assembly is prevented, and efficiency of the assembly is increased. However, even if phases of the press-in ribs 12f are at phases where the press-in ribs 12f come into contact with the outer-periphery portions 20c when the pushed surface 12h of the pinion gear 12 is pushed against the pushing surface 20e of the drive transmission member 20, there is no functional issue. Therefore, such an arrangement is possible.

Preferably, the contact surfaces 20a are surely pushed against the contacted surfaces 12c through rotation of the drive transmission member 20 while a predetermined amount or more of torque is applied to the drive transmission member 20 with, for example, a torque screwdriver. In the present exemplary embodiment, it is confirmed whether the contact surfaces 20a have been pushed against the contacted surfaces 12c by using ribs 12i of the pinion gear 12 and end surfaces 20f of the drive transmission member 20 as marks. A relative positional relation between the pinion gear 12 and the drive transmission member 20 is visually confirmed. If the drive transmission member 20 and the pinion gear 12 are attached to the rotating shaft 11 of the motor 10 although the contact surfaces 20a have not been pushed against the contacted surfaces 12c, and then, printing is started in this state, the engaging surfaces are pushed against each other during the printing, and an image defect that includes lateral streaks in the image may occur. Therefore, it is preferable to confirm whether the contact surfaces 20a have been pushed against the contacted surfaces 12c before the pinion gear 12 to which the drive transmission member 20 has been attached is attached to the rotating shaft 11 of the motor 10.

After the drive transmission member 20 is attached to the pinion gear 12 (the state in FIG. 6), the pinion gear 12 to which the drive transmission member 20 has been attached is to be attached to the rotating shaft 11 of the motor 10. If the drive transmission member 20 and the pinion gear 12 are separately attached to the rotating shaft 11 of the motor 10, the rotating shaft 11 may be deformed in two steps that include a step of attaching the drive transmission member 20 and a step of attaching the pinion gear 12. If the drive transmission member 20 and the pinion gear 12 are separately attached to the rotating shaft 11 of the motor 10, the drive transmission member 20 is attached to the rotating shaft 11. Then the rotating shaft 11 is inserted into the pinion gear 12. Then the contacted surfaces 12c and the contact surfaces 20a need to be pushed against each other by rotation of the pinion gear 12 relative to the rotating shaft 11.

To rotate the pinion gear 12 relative to the rotating shaft 11 of the motor 10, the pinion gear 12 and the rotating shaft 11 of the motor 10 each need to be held with a strong force (force that overcomes friction between an inner wall surface of the hole 12d of the pinion gear 12 and the rotating shaft 11). The pinion gear 12 and the rotating shaft 11 of the motor 10 may be deformed. Especially if the rotating shaft 11 is fixed directly with a tool, lateral shake of the rotating shaft 11 may deteriorate. It is worried that, for example, rotational fluctuation of the motor 10 may deteriorate. It is difficult to determine whether the contacted surfaces 12c of the pinion gear 12 and the contact surfaces 20a of the drive transmission member 20 have been pushed against each other.

In contrast, the present exemplary embodiment includes only a step of attaching, to the rotating shaft 11 of the motor 10, the pinion gear 12 to which the drive transmission member 20 has been attached. The present exemplary embodiment includes only one step that may deform the rotating shaft 11. The rotating shaft 11 is less likely to be deformed.

Preferably, in the present exemplary embodiment, the guiding surface 20g is formed on the drive transmission member 20 by chamfering of approximately 0.5 mm. In this way, when the pinion gear 12 to which the drive transmission member 20 has been attached is attached to the rotating shaft 11, the rotating shaft 11 inserted into the hole 20b of the drive transmission member 20 is guided to be inserted into the hole 12d of the pinion gear 12. Due to the guiding surface 20g, the rotating shaft 11 of the motor 10 is less likely to be deformed even if centers of the drive transmission member 20 and the rotating shaft 11 of the motor 10 that are attached to each other misalign.

Since the drive transmission member 20 plays a role of receiving a driving force from the rotating shaft 11, accuracy of a position where the pinion gear 12 is attached can be enhanced. For this reason, in an image forming device including the driving device 1 according to the present exemplary embodiment, eccentricity between the pinion gear 12 and the rotational center of the rotating shaft 11 of the motor 10 can be prevented, rotation of the rotated bodies can be highly accurate, and images with higher image qualities can be output.

Figure 8A:
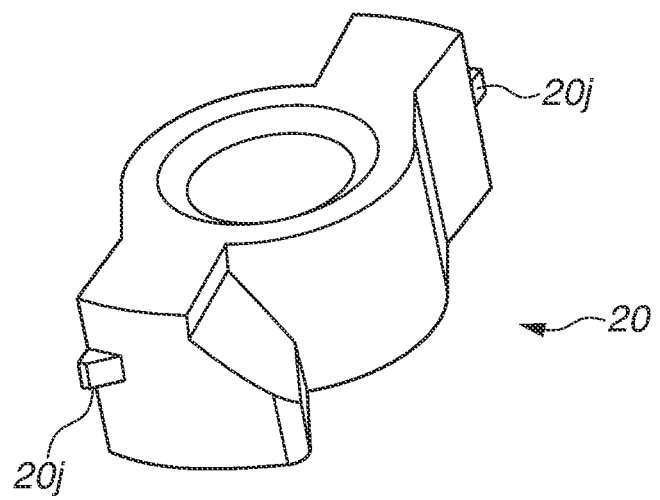
FIGS. 8A and 8B are schematic views of the pinion gear and the drive transmission member including press-in ribs according to the first exemplary embodiment.
Figure 8B:
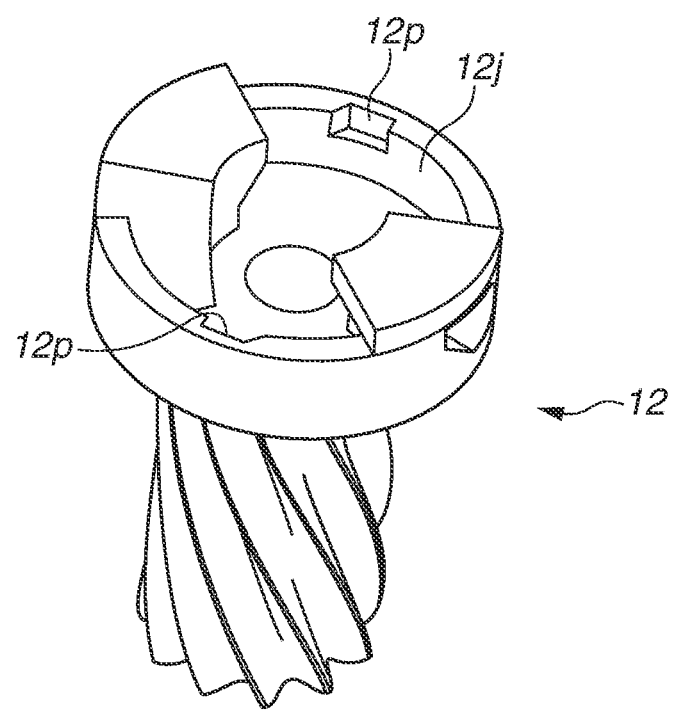
Figure 9A:
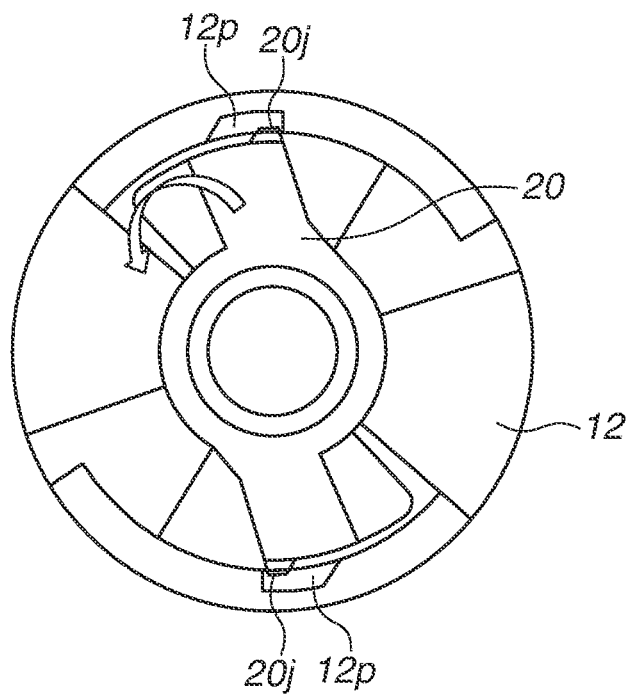
FIGS. 9A and 9B are schematic views of the drive transmission member including the press-in ribs and attached to the pinion gear, according to the first exemplary embodiment.
Figure 9B:
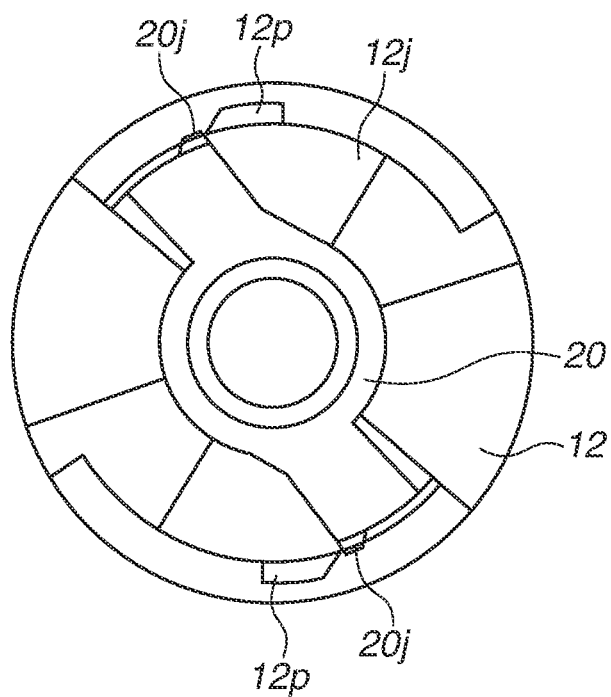

In the present exemplary embodiment, the pinion gear 12 has the press-in ribs 12f. However, the drive transmission member 20 may have the press-in ribs 12f. As illustrated in FIG. 8A, the drive transmission member 20 has two press-in ribs (engaging portions) 20j on the outer-periphery portions 20c. The two press-in ribs (engaging portions) 20j are projections that protrude toward the pinion gear 12. An outer diameter between the press-in ribs 20j is set to be larger than an inner diameter between inner-periphery portions (engaged portions) 12j of the ribs 12i of the pinion gear 12. In this case, as illustrated in FIG. 8B, the pinion gear 12 has two recesses 12p on inner peripheries of the ribs 12i. While the press-in ribs 20j are fit in the recesses 12p on inner peripheries of the ribs 12i, the pushing surface 20e of the drive transmission member 20 is pushed against the pushed surface 12h of the pinion gear 12 (FIG. 9A). Then the pinion gear 12 and the drive transmission member 20 are attached together (FIG. 9B) by rotation of the drive transmission member 20. As described above, the press-in ribs 20j enable the drive transmission member 20 and the pinion gear 12 to be held together (FIG. 9B) so that assembly can be more efficient.

With this configuration, the pinion gear 12 has the two press-in ribs 12f that are opposite each other. However, the pinion gear 12 may have two or more press-in ribs, or only one press-in rib. However, if the number of press-in ribs is an even number, it is easier to control an amount of eccentricity between the hole 12d of the pinion gear 12 and the hole 20b of the drive transmission member 20.

In the present exemplary embodiment, the pinion gear 12 has the press-in ribs 12f that increase friction between the drive transmission member 20 and the pinion gear 12 so that the drive transmission member 20 and the pinion gear 12 are not removed from each other, in order to hold the drive transmission member 20 and the pinion gear 12 together. However, any holding method can be used as long as the drive transmission member 20 and the pinion gear 12 are held together. As another configuration, a distance between the outer-periphery portions 20c of the drive transmission member 20 is larger than a distance between the inner-periphery portions 12j of the ribs 12i of the pinion gear 12 so that the drive transmission member 20 can be pressed into the pinion gear 12.

The present exemplary embodiment can be used for other types of motors, such as a brushless DC motor and a stepping motor. Further, in the present exemplary embodiment, an image forming device is exemplified. However, a driving device according to an exemplary embodiment of the present disclosure is applied not only to an image forming device, but also to various machines and devices.

Figure 10:
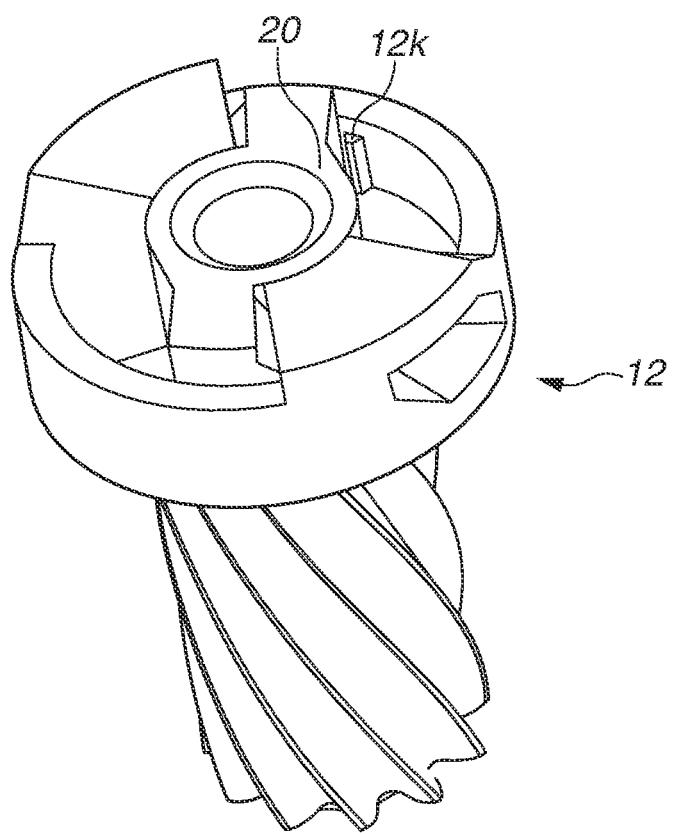
FIG. 10 is a schematic view of a drive transmission member attached to a pinion gear according to a second exemplary embodiment.

FIG. 10 is a schematic view of a pinion gear 12 and a drive transmission member 20 according to a second exemplary embodiment. In FIG. 10, the pinion gear 12 and the drive transmission member 20 are attached together. Here, features of the second exemplary embodiment will be described. Other configuration and effects of the second exemplary embodiment are the same as the configuration and the effects of the first exemplary embodiment, and thus will not be described.

As illustrated in FIG. 10, the pinion gear 12 has removal prevention ribs (engaging portions) 12k. The removal prevention ribs (engaging portions) 12k protrude toward the drive transmission member 20 (a rotating shaft 11 not illustrated). The drive transmission member 20 is to be attached to the pinion gear 12, similarly as the first exemplary embodiment. When the drive transmission member 20 is to be attached to the pinion gear 12 by rotation of the drive transmission member 20, outer-periphery portions (engaged portions) 20c of the drive transmission member 20 need to pass over the removal prevention ribs 12k of the pinion gear 12. After the outer-periphery portions 20c of the drive transmission member 20 pass over the removal prevention ribs 12k, the removal prevention ribs 12k increase friction between the pinion gear 12 and the drive transmission member 20. As a result, the drive transmission member 20 is prevented from being removed from the pinion gear 12, and the pinion gear 12 and the drive transmission member 20 can be held as a single body.

Figure 11A:
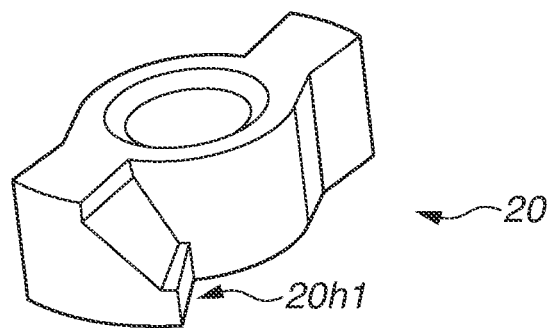
FIG. 11A is a schematic view of a drive transmission member according to a third exemplary embodiment.
Figure 11B:
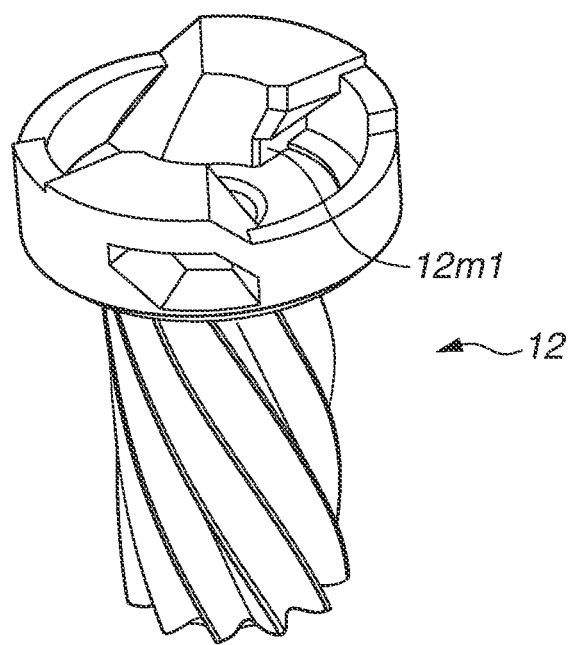
FIG. 11B is a schematic view of a pinion gear according to the third exemplary embodiment.

FIGS. 11A and 11B are schematic views of a pinion gear 12 and a drive transmission member 20 according to a third exemplary embodiment. Here, features of the third exemplary embodiment will be described. Other configuration and effects of the third exemplary embodiment are the same as the configuration and the effects of the first exemplary embodiment, and thus will not be described.

As illustrated in FIGS. 11A and 11B, the pinion gear 12 has recesses 12m1, and the drive transmission member 20 has projections 20h1. A height $H_{12\text{-}1}$ of the recesses 12m1 is slightly smaller than a height $H_{20\text{-}1}$ of the projections 20h1. The height $H_{12\text{-}1}$ of the recesses 12m1 and the height $H_{20\text{-}1}$ of the projections 20h1 extend in an axial direction of a rotating shaft 11.

Figure 12:
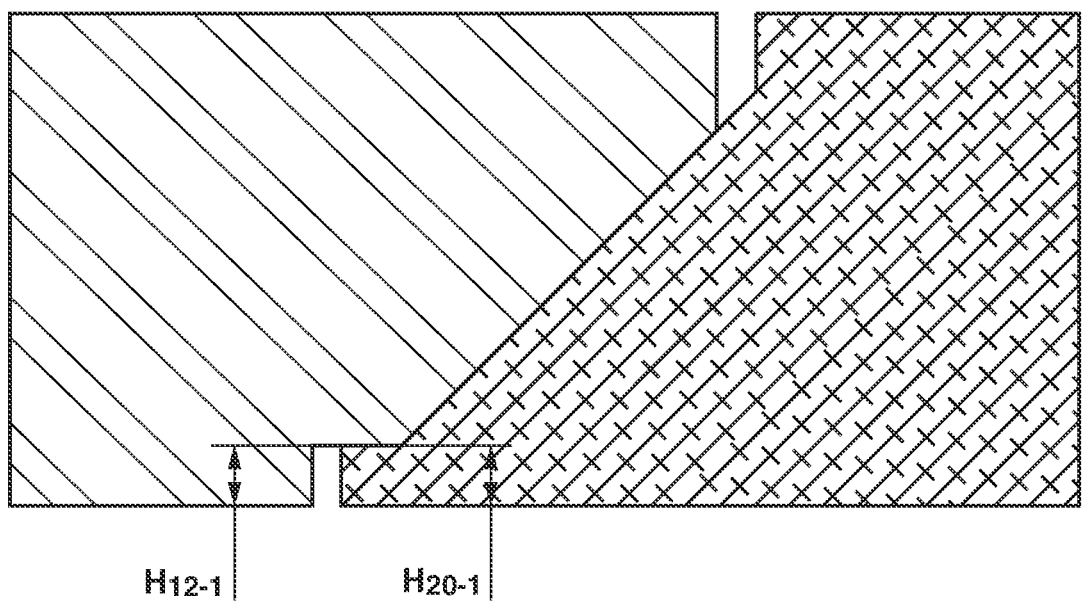
FIG. 12 is a cross-sectional view of the pinion gear and the drive transmission member according to the third exemplary embodiment.

The drive transmission member 20 is to be attached to the pinion gear 12, in the same manner as in the first exemplary embodiment. When the drive transmission member 20 is to be attached to the pinion gear 12 by rotation of the drive transmission member 20, the projections 20h1 are pressed into the recesses 12m1, as illustrated in FIG. 12. The projections 20h1 are pressed into and held in the recesses 12m1 so that the pinion gear 12 and the drive transmission member 20 can be held together. At this time, a press-in amount needs to be small. If the press-in amount is large, the recesses 12m1 push out the projections 20h1, and thus, engaging surfaces and engaged surfaces may be separated from each other.

Figure 13:
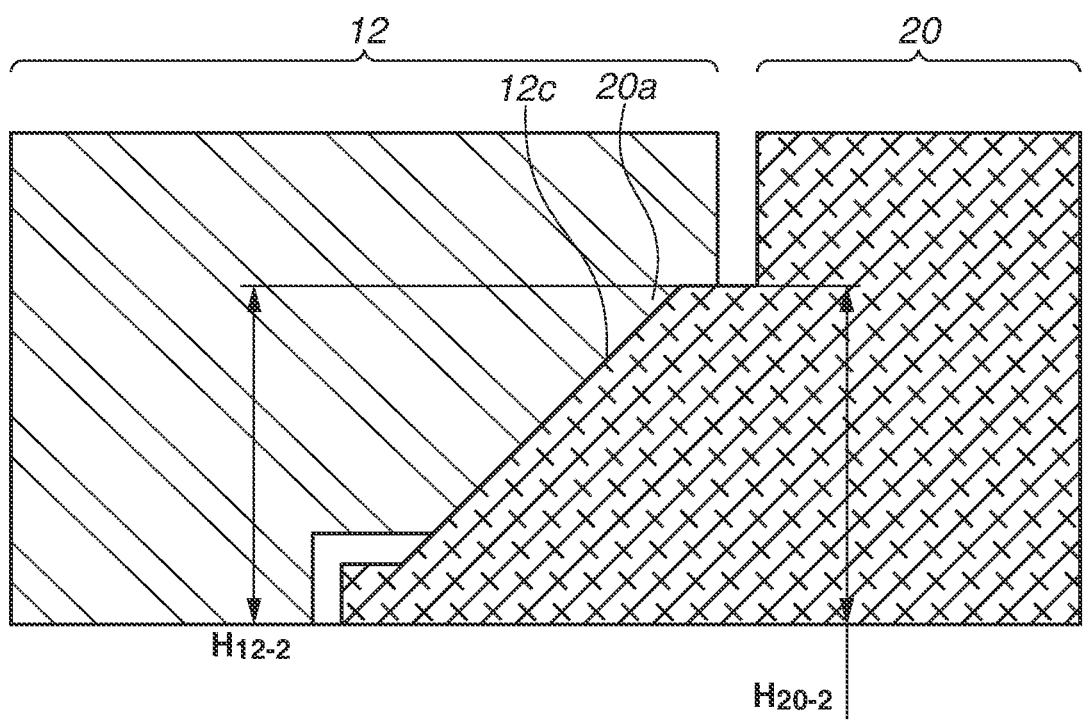
FIG. 13 is a cross-sectional view of the pinion gear including protrusions and the drive transmission member according to the third exemplary embodiment.

In the present exemplary embodiment, the pinion gear 12 has the recesses 12m1, and the drive transmission member 20 has the projections 20h1. However, the drive transmission member 20 may have recesses, and the pinion gear 12 may have projections as long as the drive transmission member 20 and the pinion gear 12 can be held together. An example is illustrated in FIG. 13. The pinion gear 12 has projections 12m2, and the drive transmission member 20 has recesses 20h2. A height $H_{12\text{-}2}$ of the recesses 12m2 is slightly smaller than a height $H_{20\text{-}2}$ of the projections 20h2 so that the projections 20h2 can be pressed into the recesses 12m2.

FIGS. 14A, 14B, 15A and 15B are schematic views of a pinion gear 12 and a drive transmission member 20 according to a fourth exemplary embodiment. Here, features of the fourth exemplary embodiment will be described. Other configuration and effects of the fourth exemplary embodiment are the same as the configuration and the effects of the first exemplary embodiment, and thus will not be described.

Figure 14A:
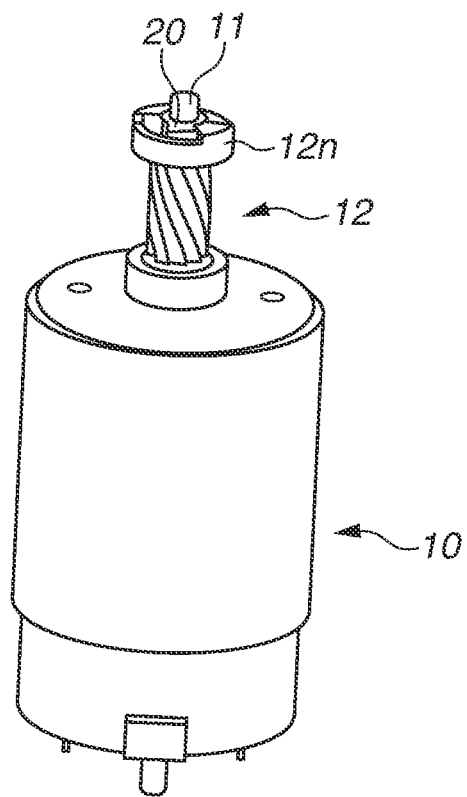
FIGS. 14A and 14B are schematic views of an assembled motor according to a fourth exemplary embodiment.
Figure 14B:
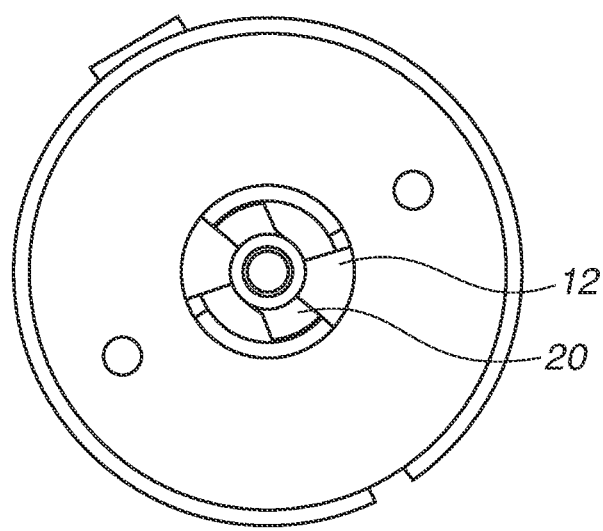
Figure 15A:
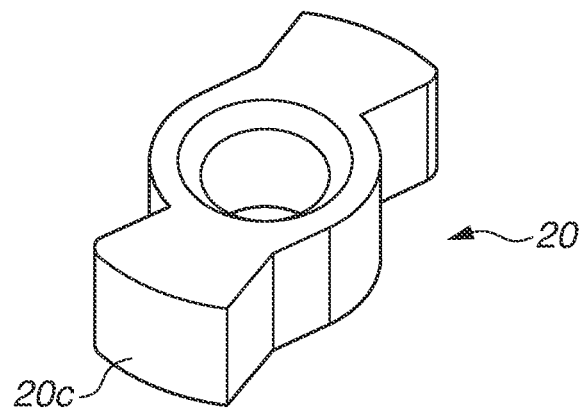
FIG. 15A is a schematic view of a drive transmission member according to the fourth exemplary embodiment.
Figure 15B:
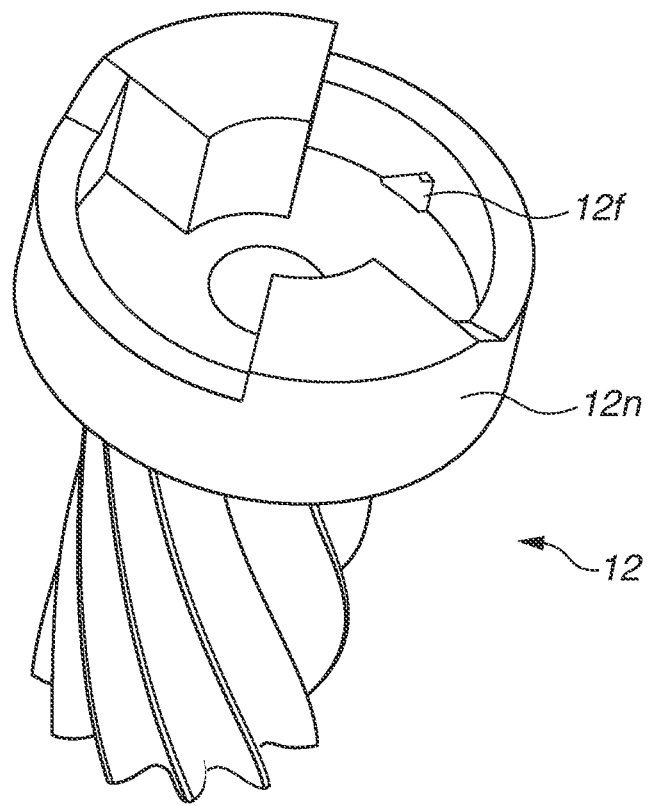
FIG. 15B is a schematic view of a pinion gear according to the fourth exemplary embodiment.

As illustrated in FIGS. 14A and 14B, the pinion gear 12 is disposed between the drive transmission member 20 and a motor 10. The arrangement is different from the arrangements of the first to third exemplary embodiments. For this reason, the drive transmission member 20 also functions to prevent the pinion gear 12 from being removed even when a thrust force of a helical gear of the pinion gear 12 acts in a direction in which the pinion gear 12 is removed. Since the drive transmission member 20 prevents the pinion gear 12 from being removed, engaging surfaces do not need to be inclined at an angle. For this reason, since undercuts are not necessary, a configuration of a mold of the pinion gear 12 becomes simple. Further, it is easy to confirm whether engaging surfaces and engaged surfaces are pushed against each other after assembly. Accordingly, the engaging surfaces and the engaged surfaces cam be more surely pushed against each other.

Thrust positions of teeth surfaces of the pinion gear 12 can be closer to a root of the rotating shaft 11 of the motor 10 than thrust positions in the first to third exemplary embodiments. Therefore, influence of shake of the rotating shaft 11 of the motor 10 can be decreased, and thus, rotational accuracy can be enhanced.

The pinion gear 12 and the drive transmission member 20 are held together using a configuration that is the same as the configurations in the first to third exemplary embodiments.

Figure 16A:
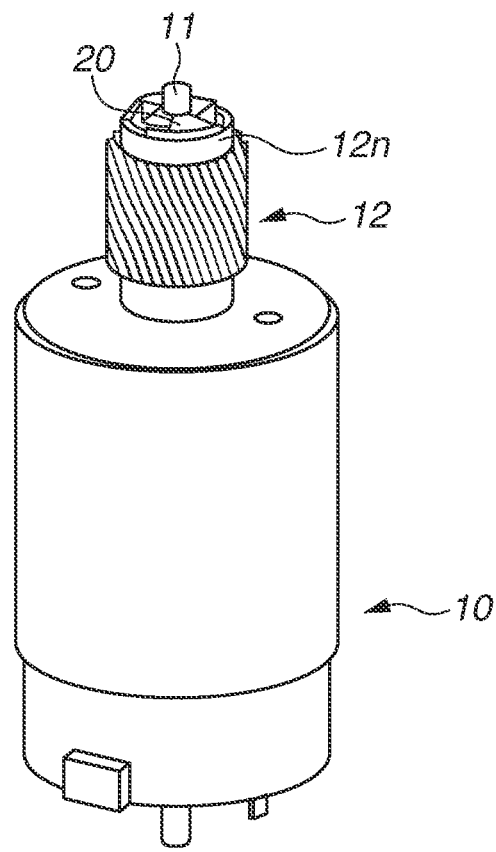
FIGS. 16A and 16B are schematic views of the assembled motor, with a root circle of the pinion gear larger than a flange outer periphery.
Figure 16B:
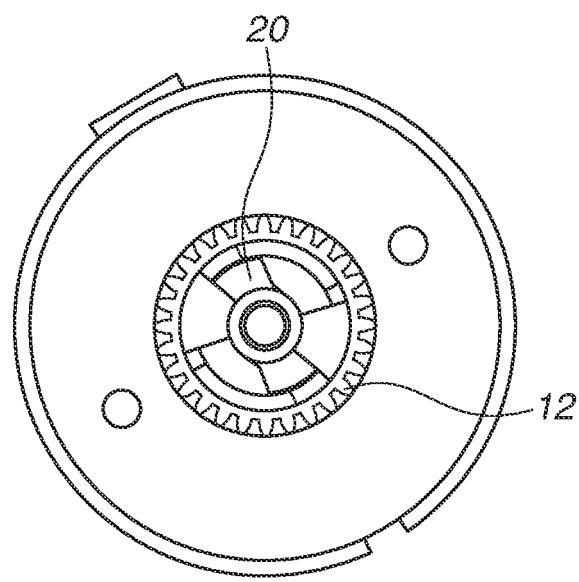

FIGS. 14A and 14B illustrate an example in which a flange outer periphery 12n is larger than a root circle of the pinion gear 12. However, a flange outer periphery 12n may be smaller than a root circle of a pinion gear 12, as illustrated in FIGS. 16A and 16B. If a flange outer periphery 12n is larger than a root circle of a pinion gear 12, the motor 10 can be more efficiently replaced, and the meshing gears can be more efficiently replaced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-150749, filed Aug. 20, 2019, which is hereby incorporated by reference herein in its entirety.

What is claimed is:

1. A driving device comprising:
   a motor including a rotating shaft;
   a drive transmission member including a contact portion and a first hole into which the rotating shaft is inserted; and
   a drive output member including a contacted portion and a second hole into which the rotating shaft is inserted, the drive output member is configured to be rotated around the rotating shaft while the contact portion comes into contact with the contacted portion when the rotating shaft of the motor is driven and the drive transmission member is rotated together with the rotating shaft in a first direction,
   wherein the drive transmission member further includes an engaging portion,
   wherein the drive output member includes an engaged portion configured to engage with the engaging portion such that the drive transmission member is pressed into the drive output member.

2. The driving device according to claim 1, wherein the drive transmission member is arranged between the drive output member and the motor.

3. The driving device according to claim 1, wherein the drive output member is arranged between the drive transmission member and the motor.

4. The driving device according to claim 1, wherein the engaging portion is held between engaged portions.

5. The driving device according to claim 1, wherein the engaging portion is engaged with the engaged portion, and the contact portion is in contact with the contacted portion.

6. The driving device according to claim 1, wherein the contact portion includes a surface inclined relative to the rotating shaft.

7. The driving device according to claim 6, wherein the contact portion includes a plurality of surfaces inclined relative to the rotating shaft.

8. The driving device according to claim 6,
wherein the drive output member includes a helical gear configured to transmit a driving force to a driven member, and
wherein a direction of twist of the helical gear and a direction of inclination of the surface each extend from one end to the other end of the rotating shaft while going farther away from the rotating shaft toward one side relative to the rotating shaft.

9. The driving device according to claim 1, wherein the drive output member is attached to the rotating shaft with no gap between the drive output member and the rotating shaft.

10. The driving device according to claim 1, wherein the drive output member is formed of resin and the drive transmission member is formed of metal.

11. The driving device according to claim 1, wherein the motor includes a direct current (DC) brush motor.

12. An image forming device comprising:
a photoconductive drum configured to bear a toner image; and
the driving device according to claim 1.

13. A method of manufacturing a driving device, the driving device including:
a motor including a rotating shaft;
a drive transmission member and including a contact portion and a first hole into which the rotating shaft is inserted; and
a drive output member including a contacted portion and a second hole into which the rotating shaft is inserted, and the drive output member configured to be rotated around the rotating shaft when the rotating shaft of the motor is driven and the drive transmission member is rotated together with the rotating shaft in a first direction, the method comprising:
a first step of pressing the drive transmission member into the drive output member such that the contacted portion is in contact with the contact portion; and
a second step of inserting the rotating shaft into the first hole and the second hole such that the drive transmission member is attached to the rotating shaft, after the first step.

14. The method of manufacturing a driving device according to claim 13, wherein the second step includes pressing the rotating shaft into the first hole of the drive transmission member.

15. The method of manufacturing a driving device according to claim 14,
wherein the second step includes pressing the rotating shaft into the second hole of the drive output member, and
wherein a force by which the rotating shaft is pressed into the drive output member is smaller than a force by which the rotating shaft is pressed into the drive transmission member.

16. The method of manufacturing a driving device according to claim 14, wherein the first step includes rotating the drive transmission member relative to the drive output member to bring the contacted portion into contact with the contact portion.

17. The method of manufacturing a driving device according to claim 13, wherein the drive output member is formed of resin and the drive transmission member is formed of metal.

18. The driving device according to claim 1, wherein the rotating shaft is pressed into the first hole.

19. The driving device according to claim 18, wherein the rotating shaft is pressed into the second hole.

20. The driving device according to claim 1, wherein the contact portion and the contacted portion are inclined to prevent the drive output member from being removed from the rotating shaft.

* * * * *